United States Patent [19]

Sugiura et al.

[11] 4,344,039

[45] Aug. 10, 1982

[54] DEMODULATING CIRCUIT FOR SELF-CLOCKING-INFORMATION

[75] Inventors: Youji Sugiura, Gifu; Satoshi Nishimura, Kagamihara, both of Japan

[73] Assignee: Sanyo Electric Co., Ltd., Moriguchi, Japan

[21] Appl. No.: 127,432

[22] Filed: Mar. 5, 1980

[30] Foreign Application Priority Data

Mar. 13, 1979 [JP] Japan ................................. 54-29661
Aug. 31, 1979 [JP] Japan ................................ 54-111920

[51] Int. Cl.³ .............................................. H03K 9/06
[52] U.S. Cl. ..................................... 329/50; 329/107; 375/82; 375/94; 375/110
[58] Field of Search ........................ 329/50, 104, 107; 375/78, 80, 82, 94, 110

[56] References Cited

U.S. PATENT DOCUMENTS

4,012,697  3/1977  Ballinger ......................... 375/110 X
4,059,806 11/1977  Vagt, Jr. ............................... 329/107
4,242,754 12/1980  De Pouilly et al. ................. 375/110

Primary Examiner—Siegfried H. Grimm
Attorney, Agent, or Firm—Darby & Darby

[57] ABSTRACT

A circuit for demodulating either an MFM (modified frequency modulated) or an FM (frequency modulated) self-clocking-information signal is adapted to measure a time period corresponding to a signal reversion period and quantize the measured time period, whereby the quantized output determines a signal reversion period. Pulses of the number corresponding to the quantized output are generated and clock pulses for demodulating the original data are regenerated based on the above described pulses. In the case where the self-clocking-information signal is MFM, the original data is demodulated by reading the data regenerated based on the said pulses of the number corresponding to the quantized output based on the regenerated clock pulses. In the case where the self-clocking-information signal is FM, the original data is demodulated by reading the specified quantized output based on the above described regenerated clock pulses.

26 Claims, 18 Drawing Figures

DEMODULATING CIRCUIT FOR SELF-CLOCKING-INFORMATION

BACKGROUND OF THE INVENTION

1. Field of the Invention

The present invention relates to a demodulating circuit for a self-clocking-information signal. More specifically, the present invention relates to a demodulating circuit for demodulating the original digital data from a self-clocking-information (SCI) signal including a rectangle wave pulse train obtained by modulating a digital data signal of the logics one and zero such that the signal reversion periods may be of two or more predetermined different lengths.

2. Description of the Prior Art

In recording on a recording medium such as a magnetic tape the information stored in a storage means in a computer, a data processing unit, and the like, first of all information is extracted from the storage means while the same is gated as a function of a timing clock or a reading clock. The information thus extracted comprises a digital data signal of the logics one and zero and normally a timing clock and such a digital data signal are recorded in and reproduced from separate tracks of a magnetic tape. Since this approach requires two tracks (a digital data track and a timing clock track) utilization efficiency of a recording medium is poor. Therefore, for the purpose of enhancing the data capacity in a recording medium such as a magnetic tape, a self-clocking-information signal is produced through modulation of various types by combining a timing clock and a digital data signal, whereupon the self-clocking-information signal is recorded in and reproduced from a recording medium such as a magnetic tape, and the original digital data signal is demodulated from the reproduced self-clocking-information signal.

Figure 1:
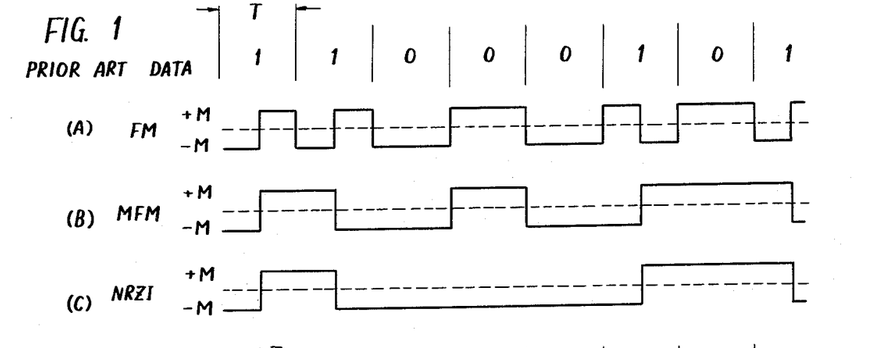
FIG. 1 is a graph showing waveforms of the currents on the occasion of recording a self-clocking-information signal in accordance with various conventional types of modulation.

FIG. 1 shows waveforms of a self-clocking-information signal during of recording in accordance with various conventional modulation types which constitute the background of the invention. Referring to FIG. 1, the reference character T denotes a time zone corresponding to a zone of a magnetic tape in which the respective data bits are recorded. The waveform (A) shows an FM (frequency modulation) type, wherein the signal is reversed at the center of the zone for the logic one of the data bit and at the boundary between two adjacent data bits. The waveform (B) shows an MFM (modified frequency modulation) type, wherein the signal is reversed at the center of the zone for the logic one of the data bit and at the boundary between two consecutive data bits of the logic zero. The waveform (C) shows an NRZI type, wherein the signal is reversed only at the center of the zone for the logic one of the data bit. As for a signal reversion period, the FM type contains two types of signal reversion periods of $\frac{1}{2}$T and T, the MFM type contains three types of the signal reversion periods of T, 1.5T and 2T, and the NRZI type contains an indefinite signal reversion period, inasmuch as the signal reversion period can be T, 2T, 3T, 4T, ... depending on the data series. The present invention is directed to an improvement in a demodulating circuit of a self-clocking-information signal produced based on a modulation type such as an FM type, an MFM type, and the like, wherein the signal reversion period can be any one of a predetermined number of different periods.

Meanwhile, as a method for demodulating a conventional self-clocking-information signal, an approach has been proposed in which a self-clocking-information signal is applied to a phase locked loop to reproduced clocks, whereupon the digital data signal is demodulated from the reproduced clocks and the self-clocking-information signal. However, such a conventional demodulating circuit, suffered from a problem of a time period required for a locking time or instability of the phase locked loop in conjunction with the disorder of a reproduced self-clocking-information signal caused by a peak shift, drop out and the like of the signal on the occasion of reproduction from a magnetic tape, for example, and also suffered from problems of such as temperature characteristic variation, time dependent variation and the like of time constant components included in the phase locked loop. Therefore, such a conventional demodulating circuit employing a phase locked loop could not necessarily perform a preferred clock reproduction. Furthermore, another disadvantage was encountered that in demodulating the original digital data signal from a self-clocking-information signal using a reproduced clock a delay means is required, which adds a factor of instability.

Figure 2:
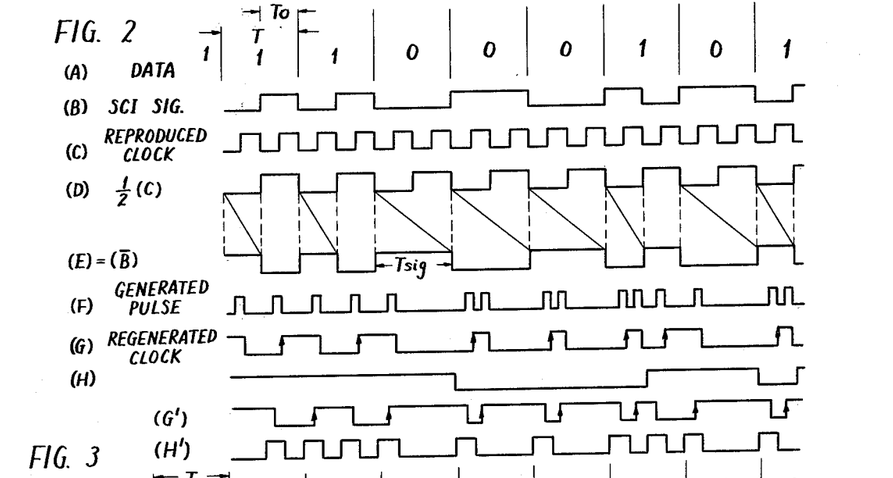
FIG. 2 is a time chart showing one example of an FM modulated self-clocking-information signal and clock pulses regenerated from the clocking information signal, for explaining the principle of the present invention in comparison with the prior art.
Figure 3:
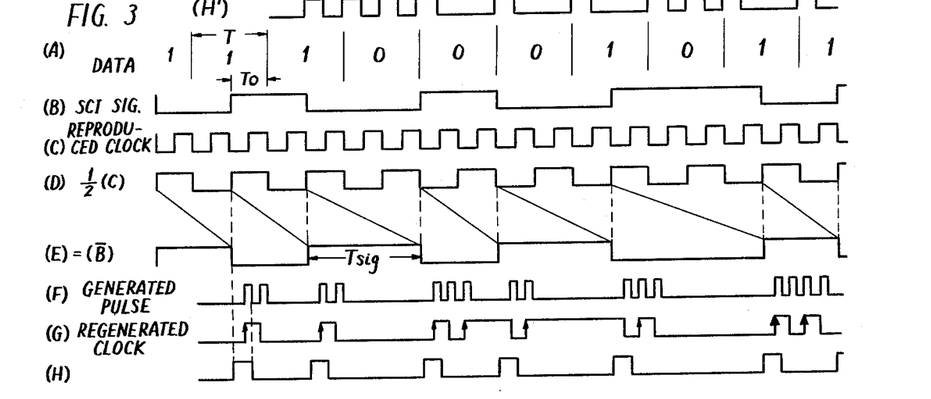
FIG. 3 is a time chart which is similar to FIG. 2 but shows a case of an MFM modulated self-clocking-information signal, for explaining the principle of the present invention in comparison with the prior art.

The above described disadvantages of the conventional approaches will be described in more detail with reference to FIGS. 2 and 3. FIG. 2 is a time chart of a self-clocking-information signal as FM modulated and a reproduced clock as reproduced from the self-clocking-information signal and FIG. 3 is a time chart of a self-clocking-information signal as MFM modulated and a reproduced clock reproduced from the self-clocking-information signal. Referring to FIGS. 2 and 3, (A) each shows a waveform of the digital data, wherein the repetition period of the data bit is defined as T and a half thereto is defined as To. Referring to FIGS. 2 and 3, (B) each shows a waveform of a self-clocking-information signal obtained by FM modulating and MFM modulating the digital data (A). Referring to FIGS. 2 and 3, (C) each shows a reproduced clock reproduced by a demodulating method from the self-clocking-information signal by the use of a conventional phase locked loop. Referring to FIGS. 2 and 3, (D) each shows a waveform obtained by frequency dividing at the fall of the reproduced clock.

In demodulating a digital data signal in accordance with the conventional approaches, use is made of the fact that if and when reversion of the self-clocking-information signal (B) (of FIGS. 2 and 3) occurs in the vicinity of the rise of the reproduced clock (D) (of FIGS. 2 and 3) the data is the logic one and if and when reversion of the self-clocking-information does not occur the data is the logic zero and a gated signal obtained as the logic one for a predetermined time period after the reversion of the self-clocking-information signal is used as the data, while the signal obtained by delaying the reproduced clock for a predetermined time period is used as a reading or demodulating clock operable at the rise thereof. According to such conventional approaches, a delay means is required for delaying the signal and therefore addition of such unstable element is not preferred. Furthermore, the self-clocking-information signal reproduced from a magnetic tape and the like contains fluctuations due to instability of a magnetic tape drive mechanism, peak shift and the like. Therefore, in this case, a situation occurs in which the reproduced self-clocking-information signal (B) and the regenerated clock (C) or (D) are out of phase due to a response rate of the phase locked loop and a disadvantage is encountered during such a period that a digital data signal is eroneously demodulated.

SUMMARY OF THE INVENTION

A self-clocking-information signal that can be demodulated in accordance with the present invention comprises a rectangle wave pulse train obtained by modulating a digital data signal of the logics one and zero such that the signal reversion periods may be any of two or more predetermined different periods. Pulses of the predetermined number corresponding to each of the predetermined periods are generated based on which predetermined period each said signal reversion period of the rectangle wave pulse train is. Clock pulses are regenerated for demodulating the original digital data based on the above described predetermined number of pulses.

According to the present invention, a phase locked loop as used in a conventional demodulating circuit can be dispensed with. Accordingly, the inventive demodulating circuit is immune to any adverse influence caused by a fluctuation of such as peak shift and the like and can demodulate data with more accuracy. Furthermore, because a time constant element such as a phase locked loop, a delay means, and the like is not used, the inventive demodulating circuit is also immune to influences of such as temperature variation, time dependent variation, source voltage variation, and the like and hence enables stable demodulation. Since the present invention does not employ a phase locked loop, even if the inventive demodulating circuit is temporarily placed in an abnormal state due to disturbance, the inventive demodulating circuit can recover a normal state immediately after such disturbance is eliminated.

In a preferred embodiment of the present invention, for the purpose of determining or identifying each of two or more predetermined different periods of a rectangle wave pulse train, a time period corresponding to each of the predetermined different periods is measured and quantization takes place based on the time period thus measured. The quantized output is used as a signal for identifying each of the predetermined periods. In a preferred embodiment of the present invention, the signal reversion periods of the rectangle wave pulse train can be determined or identified with a simple structure as to which of the predetermined periods each said signal reversion period corresponds to. Furthermore, each of the signal reversion periods can be accurately determined. In case of the FM self-clocking-information signal, the quantized output can be used as data serving as a base of data being demodulated. By providing a means for specifying a time zone in which quantization is to take place, the digital data can be demodulated with more accuracy. According to a further preferred embodiment of the present invention, a means for determining time periods corresponding to the signal reversion periods is implemented by a counter for counting the number of clock pulses during each of the predetermined periods. The output of the counter can be used for generating pulses of the number corresponding to the lengths of the signal reversion periods. Accordingly, a demodulating circuit of a more simplified circuit configuration is provided which enables accurate data demodulation.

In a still further predetermined embodiment of the present invention, the pulses of the number corresponding to each of the signal reversion periods are frequency divided to regenerate a clock pulse. A frequency divider for that purpose is adapted to be reset when the longest signal reversion period is identified. Accordingly, rises and falls of the clock pulse thus regenerated are accurately defined and as a result data is demodulated with very little possibility of errors.

Accordingly, a principal object of the present invention is to provide an improved demodulating circuit for a self-clocking-information signal which is influenced very little by environmental variation.

Another object of the present invention is to provide a structurally simple demodulating circuit for a self-clocking-information signal, wherein data can be demodulated with accuracy.

A further object of the present invention is to provide a demodulating circuit for a self-clocking-information signal, wherein influences of, e.g., peak shifts and the like can be reduced as much as possible.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Before describing the preferred embodiment of the present invention, the present invention will be generally described with reference to FIGS. 2 and 3.

Referring to FIGS. 2 and 3, let it be assumed that the signal reversion periods of a self-clocking-information signal are Tsig and Tsig=mTo.

A self-clocking-information signal reproduced from a magnetic tape or the like is susceptible to influences of peak shifts and the like as described previously, and hence, as shown, does not necessarily provide accurate signal reversion periods; however, in FM modulation as shown in FIG. 2 the above described equation is established with approximate values of m=1 or m=2. Therefore, in accordance with the present invention, the signal reversion periods Tsig are measured. Preferably, the measured signal reversion periods are quantized, on the assumption that m=1 or 2. If and when the quantized m is "1", i.e. the signal reversion period is "1To", then a single pulse is generated as shown as (F) in FIG. 2 during the next following signal reversion period. On the other hand, if and when the quantized m is "2", i.e. the signal reversion period is "2To", two pulses are generated as shown as (F) in FIG. 2 during a period of the signal reversion period following the same. Meanwhile, (E) of FIG. 2 shows a logical inversion ($\bar{B}$) of the self-clocking-information signal shown as (B) in FIG. 2 and (G) of FIG. 2 shows a waveform obtained by frequency dividing the pulses shown as (F) in FIG. 2 by two at their falling flanks, to serve as clock pulses for data demodulation. (H) of FIG. 2 shows data serving as a base of data being demodulated and in a preferred embodiment is a specified one out of the above described quantized signal outputs, such as an output of m=1 corresponding to a signal reversion period of 1To by reading the signal shown as (H) in FIG. 2 at the rise of the clock pulses shown as (G) in FIG. 2, the original digital data as shown as (A) in FIG. 2 can be demodulated.

In MFM modulation as shown in FIG. 3, assuming $\frac{1}{2}$T=To as in the case of the above described FM modulation, then the signal reversion periods of the self-clocking-information signal shown as (B) in FIG. 3 each may be measured as 2To, 3To and 4To. In a preferred embodiment, the signal reversion periods thus measured are quantized on the assumption that m=2, m=3, and m=4. If and when the quantized m is "2", i.e. the signal reversion period is "2To", then two pulses are generated as shown as (F) in FIG. 3 during the signal reversion period following the same. Similarly, if and when the quantized m is "3" or "4", i.e. the signal reversion period is "3To" or "4To", then three or four pulses are respectively generated during the next following signal reversion period. Meanwhile, (E) of FIG. 3 shows a logical inversion of the self-clocking-information signal and (G) of FIG. 3 shows a signal obtained by frequency dividing the pulses shown as (F) in FIG. 3 by 2 at their rising flanks serve to as clock pulses. (H) of FIG. 3 shows a signal which is set to the logic one at the signal reversion point of the self-clocking-information signal shown as (B) in FIG. 3 and reset to the logic zero at the fall of the pulse shown as (F) in FIG. 3, which signal serves as data serving as a base of data being demodulated. By reading the signal shown as (H) in FIG. 3 at the rise of the clock pulse shown as (G) in FIG. 3, the original digital data shown as (A) in FIG. 3 can be demodulated.

Now referring to FIGS. 2 and 3, comparing a relation of the reproduced clocks (C) and (D) reproduced in accordance with the conventional approach and the self-clocking-information signal (B) with a relation of the pulse (F) generated in accordance with the present invention and the clock (G) obtained by frequency dividing the same by 2 with the logical reversion output (E) of the self-clocking-information signal (D), it would be appreciated that although both show differences in their time bases, both contain the same logical information. In other words, the original digital data signal can be demodulated in accordance with the present invention as in accordance with the conventional approach. More specifically, assuming that the signal shown as (H) in FIGS. 2 and 3 is the data and the signal shown as (G) in FIGS. 2 and 3 is a clock pulse (a clock operable at the rise thereof), the original digital data signal can be demodulated.

Meanwhile, the FM modulated self-clocking-information signal shown in FIG. 2 is to be demodulated, the original digital data can be demodulated in the same manner as that in demodulating the MFM modulated self-clocking-information signal shown in FIG. 3. More specifically, referring to (H) of FIG. 3, a signal rising in response to the signal reversion of the signal shown as (E) in FIG. 3 and falling in response to the fall of the pulse shown as (F) in FIG. 3 is obtained. By reading the signal shown as (H) in FIG. 3 at the rise of the clock pulse shown as (G) in FIG. 3, the original digital data can be demodulated. This technique can also be utilized in demodulating the FM modulated self-clocking-information signal. More specifically, a signal corresponding to (H) of FIG. 3 is first prepared as shown as (H') in FIG. 2. The signal shown as (H') in FIG. 2 is a signal rising responsive to the signal reversion of the signal shown as (E) in FIG. 2 and falling at the fall of the pulse shown as (F) in FIG. 2. Even if the signal shown as (H') in FIG. 2 is read at the rise of the clock pulse shown as (G) in FIG. 2, accurate demodulated data cannot be obtained. Therefore, in such a case, a clock pulse being prepared is changed to a clock pulse as shown as (G') in FIG. 2 through frequency division by 2 in response to the rise of the pulse shown as (F) in FIG. 2. By reading the signal shown as (H') in FIG. 2 at the rise of the clock shown as (G') in FIG. 2, the original digital data shown as (A) in FIG. 2 can be demodulated.

In the following an embodiment of the present invention will be described in detail by taking an example of a circuit for demodulating the original digital data signal from the self-clocking-information signal of an MFM type.

Figure 4:
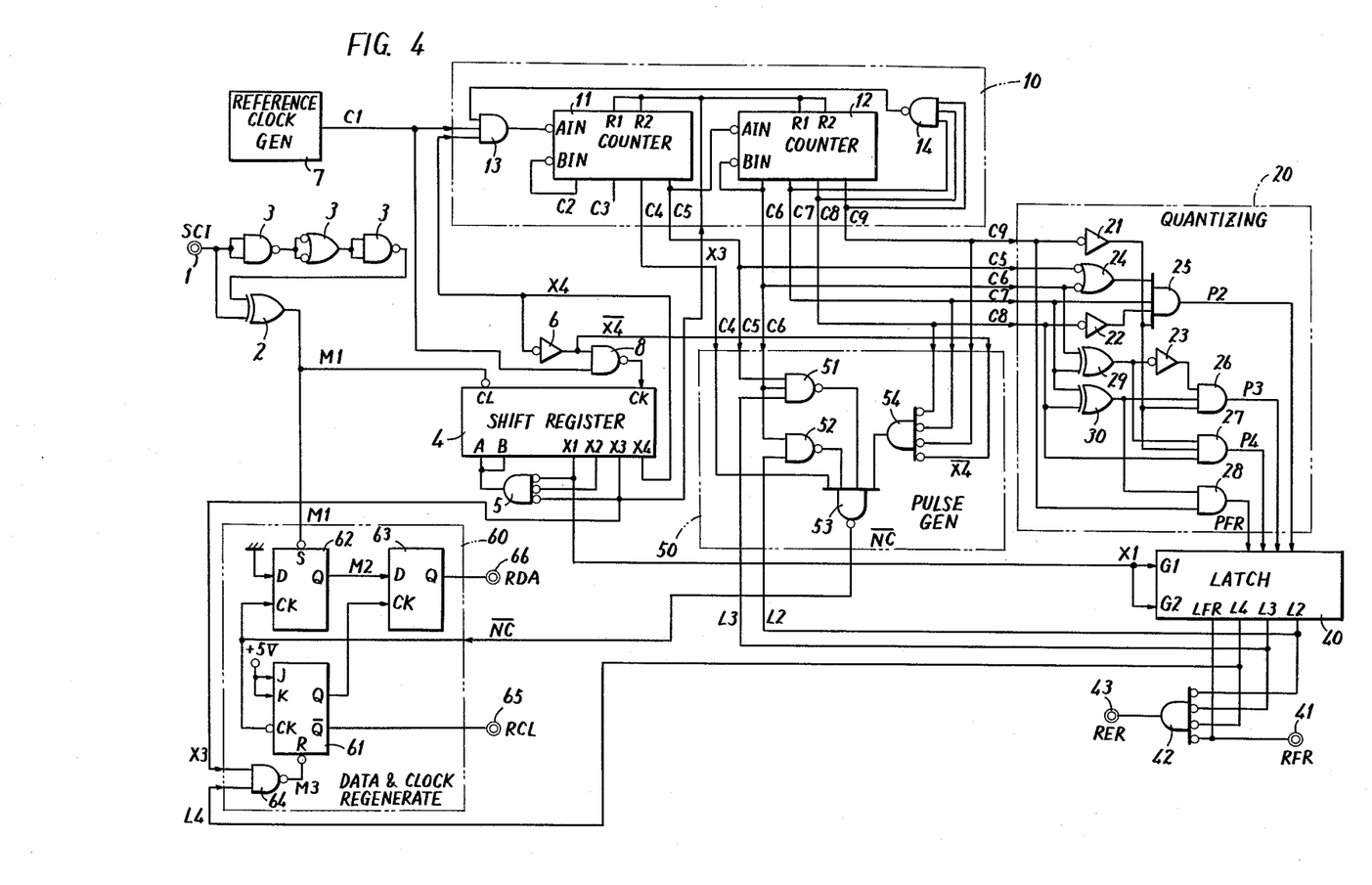
FIG. 4 is a block diagram of a demodulating circuit of an MFM modulated self-clocking-information signal in accordance with one embodiment of the present invention.
Figure 5:
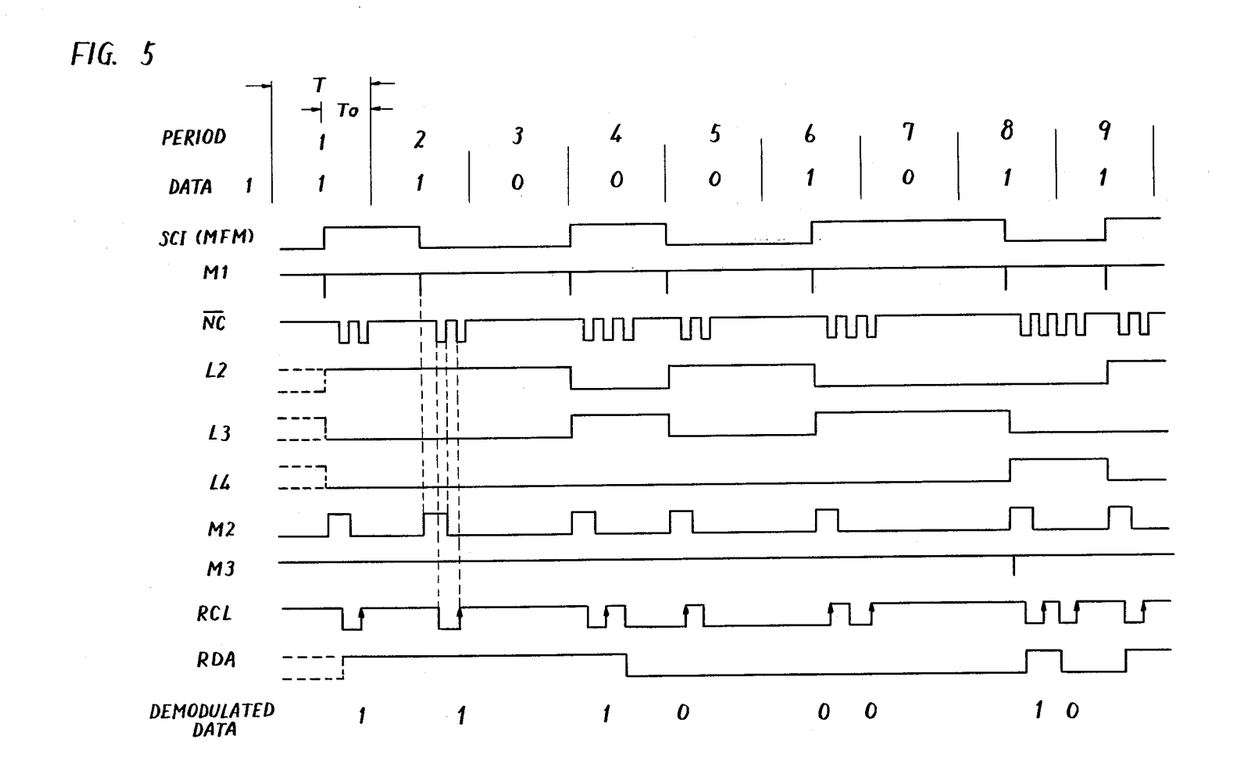
FIGS. 5, 6 and 7 are time charts for explaining the operation of the FIG. 4 embodiment.
Figure 6:
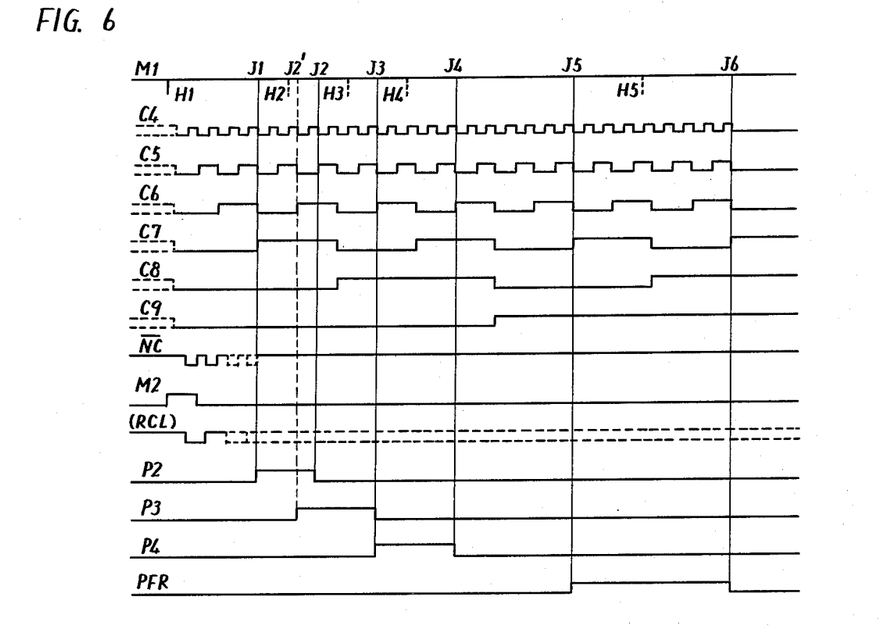
Figure 7:
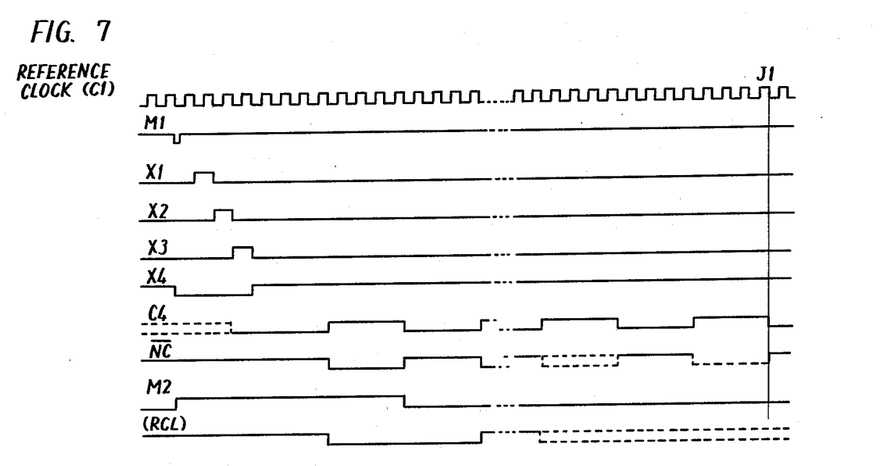

FIG. 4 is a block diagram of a demodulating circuit for a self-clocking-information signal of an MFM type. FIGS. 5, 6 and 7 show time charts for explaining the operation of the FIG. 4 demodulating circuit. More specifically, FIG. 5 is a time chart showing a major portion, FIG. 6 is a time chart showing a measuring portion of one signal inversion period of the self-clocking-information signal, and FIG. 7 is a time chart showing in detail a portion of the FIG. 5 time chart.

The FIG. 4 embodiment comprises a measuring circuit 10 for measuring a signal reversion period of an MFM modulated self-clocking-information signal received at an input terminal 1 and a quantizing circuit 20 for providing a quantized output based on the output of the measuring circuit 10. The measuring circuit 10 comprises counters 11 and 12 for counting a reference clock obtained from a reference clock generator 7. The output of the quantizing circuit 20 is latched by a latch circuit 40 until the following signal reversion occurs in the self-clocking-information signal. The pulse generating circuit 50 is responsive to the output of the measuring circuit 10 and the output of the latch circuit 40 to provide pulses $\overline{NC}$ of the number corresponding to the output of the latch circuit 40 and thus the output of the quantizing circuit 20. The predetermined number of pulses $\overline{NC}$ generated by the pulse generating circuit 50 is applied to a data/clock pulse regenerating circuit 60. The data/clock pulse regenerating circuit 60 is responsive to a signal M1 representing the occurrence of a signal reversion and the pulses $\overline{NC}$ to regenerate a clock pulse RCL for demodulation and data RDA serving as a base for data being demodulated.

On the assumption of the foregoing description, the FIG. 4 embodiment and the operation thereof will be described in more detail with reference to the time charts. Meanwhile, in the following description, the terms for representing various gate circuits, such as AND, OR, NOR, Exclusive OR and the like, are used only to identify function, rather than circuit configuration.

Referring to FIG. 4, the MFM modulated self-clocking-information signal (see FIG. 5) is received at the input terminal 1. The self-clocking-information signal is directly applied to one input of an Exclusive OR gate 2 and is also applied, after delay and inversion by three NAND gates 3, to the other input of the Exclusive OR gate 2. Accordingly, a pulse M1 (see FIG. 5) assuming the logic zero in response to signal reversion of the self-clocking-information signal is obtained from the Exclusive OR gate (2). A shift register 4 is responsive to the pulse M1, such that all the outputs X1, X2, X3 and X4 are cleared to the logic zero. When all the outputs X1, X2, and X3 become the logic zero, serial input terminals A and B of the shift register 4 connected to the output of the NOR gate 5 become the logic one. Since the output X4 is also the logic zero, the output $\overline{X4}$ of an inverter 6 becomes the logic one. Accordingly, a reference clock C1 generated by a reference clock generating circuit 7 of such as a quartz resonator is applied, after inversion by a NAND gate 8, to a clock input terminal CK of the shift register 4. Accordingly, the output X1 of the shift register 4 becomes the logic one, and as shown in FIG. 7, at the fall point of the reference clock C1. Thereafter the outputs X2, X3 and X4 of the shift register 4 successively become the logic one in synchronism with the reference clock C1 (see FIG. 7). If and when the output X4 becomes the logic one, the output of the NAND gate 8 continually remains the logic one and the shift register 4 is not supplied with the reference clock C1 any more, so that the output X4 remains the logic one until the pulse M1 is inputted again.

The counters 11 and 12 constitute a binary counter of eight bits, for example, so that the same counts the reference clock C1 being inputted through an AND gate 13 from the time when the output X4 of the shift register 4 is the logic one until the following pulse M1 is generated. More specifically, the counters 11 and 12 constitute the measuring circuit 10 for a signal reversion period Tsig of the self-clocking-information signal and the outputs C4, C5, C6, C7, C8 and C9 of the counters 11 and 12 are shown in FIG. 6. Even where the following pulse M1 does not occur within the predetermined period for some reasons such as a drop out, the output of the NAND gate 14 becomes the logic zero when all the outputs C7, C8 and C9 of the counter 12 become the logic one, whereby the AND gate 13 is rendered nonconductive to discontinue a counting operation. Meanwhile, the counters 11 and 12 are reset responsive to the output X3 of the shift register 4.

Referring to FIG. 6, let it be assumed that a pulse M1 occurs at a given time H1 and the self-clocking-information signal is accurately reproduced without any influence such as a peak shift and the like exerted thereon. In such a case, the following pulse M1 is generated at time H2 where the signal reversion period Tsig of the self-clocking-information signal is Tsig=2To, at time H3 where Tsig=3To, and at time H4 where Tsig=4To. Meanwhile, the signal reversion period Tsig of a frame synchronization signal, to be described in detail subsequently, is 8To and in such a case the following pulse M1 is generated at the timing H5.

In actuality, the timing of an occurrence of the pulse M1 is slightly shifted due to an influence of, e.g., peak shifts and the like. Therefore, where the pulse M1 occurs during a period between J1 and J2 the signal reversion period Tsig is quantized to 2To, where the pulse M1 occurs during a period between J2 and J3 the signal reversion period Tsig is quantized to 3To, where the pulse M1 occurs during a period between J3 and J4 the signal reversion period Tsig is quantized to 4To, and where the pulse M1 occurs during a period between J5 and J6 the signal reversion period Tsig is quantized to 8To, respectively. More specifically, the signal reversion periods Tsig are quantized by the quantizing circuit 20 shown in FIG. 4 based on the outputs C5, C6, C7, C8 and C9 of the above described counters 11 and 12, so that the quantized outputs P2, P3, P4 and PFR are obtained (see FIG. 6).

Meanwhile, during the period from the point J2' to the point J2, the quantized outputs P2 and P3 are both the logic one. This simplifies the structure of the pulse generating circuit 50 for generating the pulses $\overline{NC}$ corresponding to the quantized outputs and has a further purpose to be described subsequently. In the embodiment shown, even in the case where the pulse M1 occurs during the period between J2' and J2, the signal reversion period Tsig is quantized to 2To and two pulses $\overline{NC}$ are generated responsive to the quantization, as will appear below.

The quantizing circuit 20 comprises inverters 21, 22 and 23, a NAND gate 24, AND gates 25, 26, 27 and 28, and an Exclusive OR gates 29 and 30. The output of the AND gate 25 becomes the logic one only if the output C7 of the counter 12 is the logic one, the outputs C8 and C9 of the counter 12 are the logic zero, and at least one of the output C5 of the counter 11 and the output C6 of the counter 12 is the logic zero. Otherwise, the output of the AND gate 25 becomes the logic zero. More specifically, the output of the AND gate 25 is the quantized output P2 (see FIG. 6). The output of the AND gate 26 becomes the logic one if and when the outputs C6 and C7 of the counter 12 coincide with each other, the outputs C7 and C8 of the counter 12 do not coincide with each other, and the output C9 of the counter 12 is the logic zero. Otherwise, the output of the AND gate 26 is the logic zero. More specifically, the output of the AND gate 26 is the quantized output P3 (see FIG. 6). The output of the AND gate 27 is the logic one only if the output C8 of the counter 12 is the logic one, the output C9 of the counter 12 is the logic zero and the outputs C6 and C7 of the counter 12 do not coincide with each other. Otherwise, the output of the AND gate 27 is the logic zero. More specifically, the output of the AND gate 27 becomes the quantized output P4 (see FIG. 6). The output of the AND gate 28 becomes the logic one only if and when the output C9 of the counter 12 is the logic one and the outputs C7 and C8 of the counter 12 do not coincide with each other. Otherwise, the output of the AND gate 28 becomes the logic zero. More specifically, the output of the AND gate 28 becomes the quantized output PFR (see FIG. 6). Thus, the time period after one pulse M1 is generated until the following pulse M1 is generated, i.e. the signal reversion period Tsig is quantized as the signal outputs P2, P3, P4 and PFL.

The quantized outputs P2, P3, P4 and PFR are latched in the latch circuit 40, if and when the output X1 of the shift register 4 becomes the logic one in response to generation of the following pulse M1. The quantized outputs as latched in the latch circuit 40 are denoted as L2, L3, L4 and LFR. The signal LFR is withdrawn from a terminal 41 and is used as a frame synchronization signal RFR, to be described subsequently. The signals L2, L3, L4 and LFR are applied to the NOR gate 42, so that the output of the NOR gate 42 becomes the logic one only if and when all these signals are the logic zero, i.e. if and when no signal reversion occurs during the period J1 to J4 and the period J5 to J6. More specifically, in the case where a self-clocking-information signal is recorded in and reproduced from a magnetic tape and the like, assuming that the so-called drop out occurs due to dust, or a scratch (or the like) on the magnetic tape, no signal reversion occurs in the above described predetermined periods and the output of the NOR gate 42 becomes the logic one. As a result, an error detected signal RER can be obtained from the terminal 43. Even where the signal reversion period of the self-clocking-information signal becomes shorter for some reason, an error detected signal RER is obtained from the NOR gate 42. Meanwhile, conventionally an error detection bit such as a parity check code, a cyclic redundancy check or the like has been added as a redundant bit to the digital data bits and therefore the information became redundant accordingly. Furthermore, since such an error detection bit has been added to the digital data of a suitable length, the error detection capability is not perfect and, since the error check becomes possible after the above described digital data of suitable length is reproduced, the response rate becomes slower. On the contrary, the above described error detection signal RER eliminates such inconveniences.

The quantized outputs as latched in the latch circuit 40 are applied to the pulse generating circuit 50 and the pulses $\overline{NC}$ of the number corresponding to the signal reversion period as quantized are obtained from the pulse generating circuit 50. The pulse generating circuit 50 of the embodiment shown comprises NAND gates 51, 52, 53 and a NOR gate 54. Since the output of the NOR gate 54 is the logic zero during a time period when the output $\overline{X4}$ of the inverter 6 is the logic one, the output of the NAND gate 53 remains the logic one, without any change. After the output C7 of the counter 12 first becomes the logic one, one of the outputs C7, C8 and C9 becomes the logic one and therefore the output of the NOR gate 54 becomes the logic zero. Accordingly, the output of the NAND gate 53 remains the logic one (see FIG. 6). Accordingly it is sufficient to consider a change of the output of the NAND gate 53 during a time period after the output $\overline{X4}$ of the inverter 6 becomes the logic zero until the output C7 of the counter 12 first becomes the logic one, i.e. during a time period when the output of the NOR gate 54 is the logic one.

(a) If and when L2=the logic one and L3=L4=the logic zero

Figure 8:
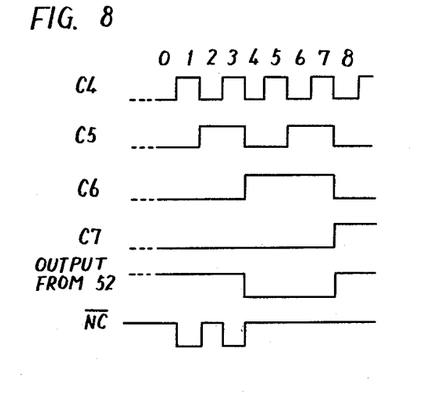
FIGS. 8, 9, 10 and 11 are time charts for explaining the operation of a pulse generating circuit.

Since L3=the logic zero, the output of the NAND gate 51 remains the logic one. Accordingly, the outputs of the NAND gates 52 and 53 change as shown in FIG. 8, so that two pulses $\overline{NC}$ are obtained from the pulse generating circuit 50.

(b) If and when L2=L3=the logic one and L4=the logic zero

Figures 9, 11:
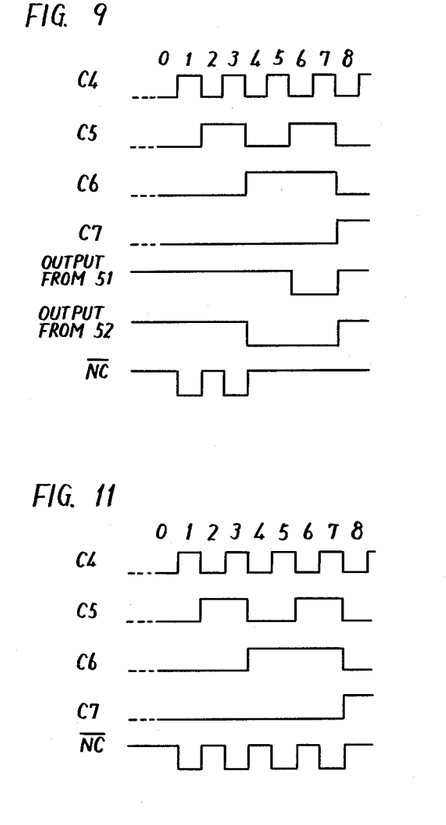

Here the outputs of the NAND gates 51, 52 and 53 change as shown in FIG. 9, so that as in the case described in the preceding paragraph (a) two pulses $\overline{NC}$ are obtained from the pulse generating circuit 50.

(c) If and when L3=the logic one and L2=L4=the logic zero

Figure 10:
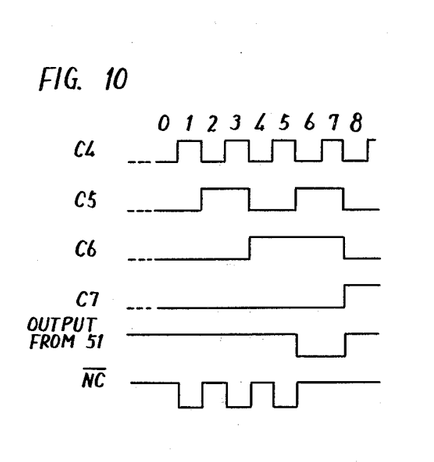

Since L2=the logic zero, the output of the NAND gate 52 remains the logic one. Accordingly, the outputs of the NAND gates 51 and 53 change as shown in FIG. 10, so that three pulses $\overline{NC}$ are obtained from the pulse generating circuit 50.

(d) If and when L4=the logic one and L2=L3=the logic zero

Since L2=L3=the logic zero, the outputs of the NAND gates 51 and 52 both remain the logic one. Accordingly, the output of the NAND gate 53 is responsive to the change of the output C4 of the counter 11 to change as shown in FIG. 11, so that four pulses $\overline{NC}$ are obtained from the pulse generating circuit 50.

Meanwhile, in the case where the quantized output LFR as latched is the logic one, as in the case of the preceding paragraph (d), four pulses $\overline{NC}$ are obtained from the pulse generating circuit 50; however, since the frame synchronization signal RFR is obtained from the terminal 41 on that occasion, as described previously, such four pulses NC are not utilized for demodulation of the digital data.

Thus, two, three or four pulses $\overline{NC}$ are obtained from the pulse generating circuit 50 corresponding to the quantized signal reversion periods 2To, 3To and 4To, respectively.

Meanwhile, as described previously, the pulse generating circuit 50 is structured to respond to the latch signal output L2 of the latch circuit 40 to generate two pulses, to respond to the latch signal output L3 of the latch circuit 40 to generate three pulses, and to respond to the latch signal output L4 of the latch circuit 40 to generate four pulses. In such a case, even when the pulse generating circuit 50 generates the maximum number of pulses, i.e. in this particular case generates four pulses, the time required for generating four pulses is selected such that these four pulses are generated within a half of the signal reversion period when the shortest quantized signal, in this case the signal P2, is obtained. The reason is that if the speed for generating the pulses by the pulse generating circuit 50 is slower a situation could occur wherein generation of four pulses would not be completed even when the output L4 is obtained from the latch circuit 40.

The pulses $\overline{NC}$ obtained from the pulse generating circuit 50 are applied to a circuit for regenerating the data and clock. The circuit 60 comprises three flip-flops 61, 62 and 63 and a NAND gate 64. The JK terminal of the JK flip-flop 61 is maintained in the high level and the pulses $\overline{NC}$ are applied as a clock, so that the outputs Q and $\overline{Q}$ of the flip-flop 61 respond to the fall of the pulses $\overline{NC}$ to be reversed. More specifically, the pulses NC are frequency divided by 2. The output $\overline{Q}$ of the flip-flop 61 is withdrawn from the terminal 65 and is used as a clock pulse RCL for demodulating the data. The JK flip-flop 61 is reset in response to the output M3 of the NAND gate 64, so that the polarity of the clock pulse RCL is placed in an initial condition.

More specifically, the NAND gate 64 is connected to receive the output X3 of the shift register 4 and the output L4 of the latch circuit 40. Since the latch output L4 becomes the logic one only if and when the bit pattern of the digital data signal becomes the logics one zero one, use is made of this particular pattern to regenerate the pulse M3, so that the JK flip-flop 61 is reset responsive to the pulse M3, whereby the polarity of the clock pulse RCL is placed in an initial condition, while the clock pulse is synchronized with the data.

On the other hand, the D flip-flop 62 is set responsive to the pulse M1, so that the output Q becomes the logic one. Since the data input D of the D flip-flop 62 is connected to the ground, the output Q is responsive to the rise of the pulses $\overline{NC}$ applied as a clock to be reset to the logic zero. Therefore, the output Q(M2) of the D flip-flop 62 changes as shown in FIG. 5. The D flip-flop 63 is connected to receive the output Q(M2) of the flip-flop 62 as a data input and the output Q of the JK flip-flop 61 as a clock input, respectively. Accordingly, the pulse M2 is latched in response to the rise of the clock and the latched output, i.e. the output Q of the D flip-flop 63 is withdrawn from the terminal 66 as data RDA serving as a base of the data being demodulated (see FIG. 5). Accordingly, as is apparent from FIG. 5, by using the output Q of the D flip-flop 63 as data RDA serving as a base of the data being demodulated and the clock pulse RCL for demodulation of the data as a clock operable at the rise thereof, the original data signal can be demodulated. Although the time base of the thus obtained digital data signal has been changed, the original digital data signal can be correctly demodulated inasmuch as the relationship between the data RDA and the clock RCL has been maintained.

Meanwhile, whether the output Q(M2) of the D flip-flop 62 is used as data RDA and the clock RCL is used as a clock operable at the fall thereof, or whether the output Q of the JK flip-flop 61 is used as a clock operable at the rise thereof, the original digital data signal can be correctly demodulated.

Figure 12:
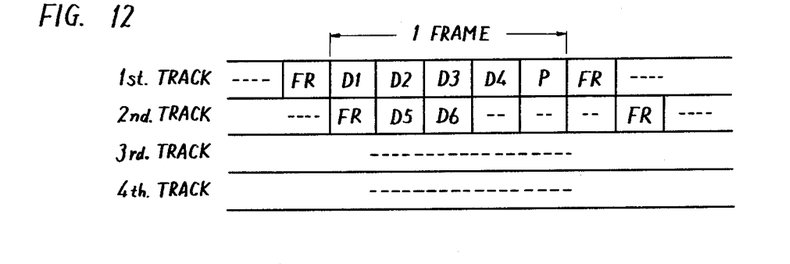
FIG. 12 is a diagram showing a relation of digital data and a frame synchronization signal.

Now the frame synchronization signal will be described. Of late, there has been proposed and put into practical use a recording apparatus wherein an audio signal is sampled and a sampled signal is pulse code modulated, whereupon the pulse code modulated signal is recorded on magnetic tape by way of modified frequency modulation or frequency modulation and reproduction is made accordingly. In case of a pulse code modulation recording apparatus of a multitrack fixed magnetic head type, a frame signal is prepared as a combination of a predetermined number of pieces of digital data D as shown in FIG. 12 (as sampled and then pulse code modulated) plus an error check/correct code P as necessary and the frame signal is recorded in a plurality of tracks. Accordingly, it is necessary to employ a frame synchronization signal FR in order to achieve a synchronized relation among the frame signals. Since such frame synchronization signal FR has a different property from that of the data obtained by sampling the audio signal, it is necessary to discriminate both by some means.

Figure 13:
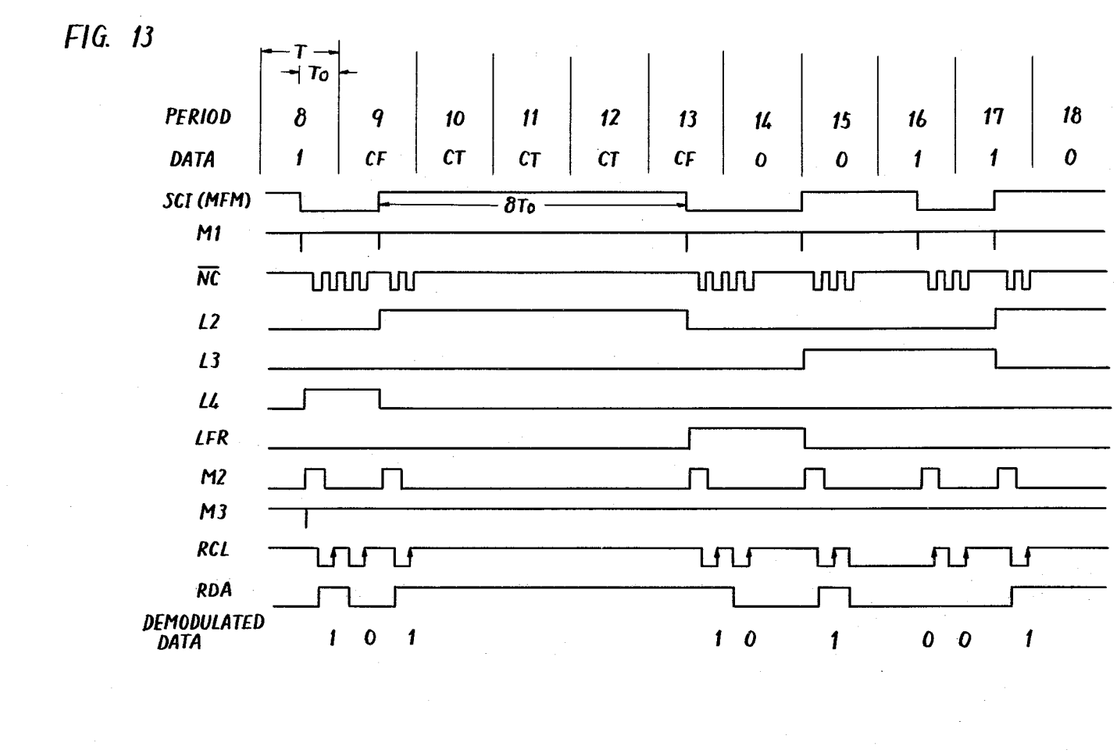
FIG. 13 is a time chart for explaining a relation with the frame synchronization signal.

For example, it is conceivable to make the frame synchronization signal in a predetermined fixed bit pattern. However, in such a case, there is a possibility that the bit pattern of the frame synchronization signal and the bit pattern of the data coincide with each other by chance and it is necessary to increase the number of bits of the frame synchronization signal in order to minimize the probability of such occurrence. Therefore, the information becomes redundant accordingly, while a demodulating circuit for detecting such specified bit pattern is required. According to the embodiment shown, therefore, the signal reversion period based on the frame synchronization signal is made different from the signal reversion periods based on the data and in the embodiment shown is selected to be 8To. This will be described in detail with reference to the time chart of FIG. 13 which is similar to FIG. 5. The period (8) in FIG. 13 is the same as the period (8) in FIG. 5 and is a period corresponding to the data. The periods (9) to (13) are those periods corresponding to the frame synchronization signal, wherein the signal is reversed at the first bit CF and the last bit CF at the center of each bit as in case of the logic one, while no signal reversion is made in three intermediate bits CT. The frame synchronization signal is thus structured and is recorded in a magnetic tape and the like. More specifically, the signal reversion period of the frame synchronization signal is 8To in the embodiment shown. In the case where such frame synchronization signal is recorded, the latch signal output LFR is obtained and the frame synchronization signal RFR is obtained from the terminal 41, as described previously. Thus, the frame synchronization signal RFR is demodulated in a form which is clearly distinguishable from the data signal. Meanwhile, although the data of the logics one zero one is demodulated responsive to the frame synchronization signal RFR, the same is not utilized as the data, as described previously. Although in the foregoing description only one kind of control signal different from the data, i.e. only the frame synchronization signal was included, two or more kinds of controls may be included, in which case it is conceivable to make different the signal reversion periods such as 6To, 7To, 8To, . . . for the respective control signals. However, as the number of kinds of the signal reversion periods increases, the structure of the quantizing circuit becomes accordingly complicated, which is not preferred. Furthermore, in considering the influence exerted by a peak shift and the like, approximation of the signal reversion periods to each other such as 6To, 7To, 8To . . . is also not preferred. Therefore, in the embodiment shown, the control signal is divided into control information and control identifying information for identifying what kind of a control signal the control information is, so that the signal reversion period of 8To may be allotted to the control information, as described previously, and in the case of three kinds of control signals, for example, the periods (14), (15) and (16) are allotted to the control identifying information. The three kinds of control signals can be discriminated by allotting the logic one to any one of these periods and allotting the logic zero to the remaining periods. Of course, the signals in the periods (14), (15) and (16) are recorded as a self-clocking-information signal as MFM modulated as in case of the digital data following the control information signal.

Figure 14:
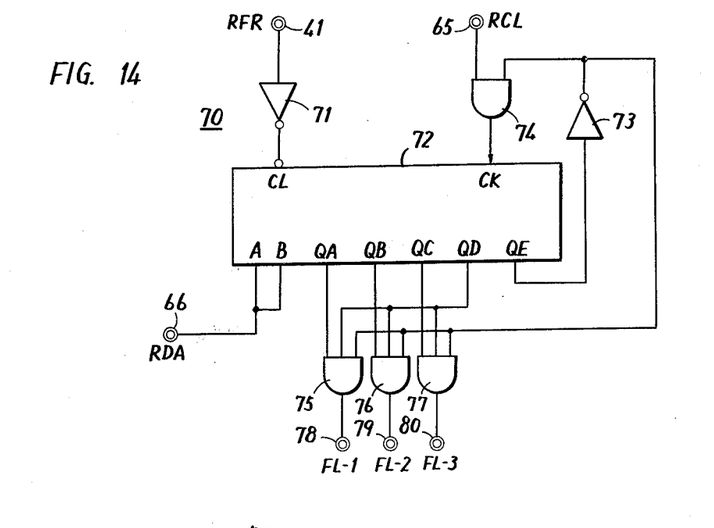
FIG. 14 is a block diagram of a demodulating circuit portion for identifying the kind of a control signal, where the control signal comprises a plurality of signals.

Assuming that the three kinds of control signals are denoted as (FR-1), (FR-2) and (FR-3), respectively, and the logic one is allotted to the period (16) in case of the control signal (FR-1), the logic one is allotted to the period (15) in case of the control signal (FR-2) and the logic one is allotted to the period (14) in case of the control signal (FR-3), respectively, the demodulating circuit 70 for the control signals will be described in the following in more detail with reference to FIG. 14. Referring to FIG. 14, the terminals 41, 65 and 66 are the same as those terminals shown in FIG. 4. The control signal RFR of the signal reversion period 8To is obtained from the terminal 41, the clock pulse RCL for demodulation of the data is obtained from the terminal 65 and the data serving as a base of the data being demodulated (including the above described control identifying information) is obtained from the terminal 66. If and when the latch signal LFR, i.e. the control signal RFR becomes the logic one, the same is applied to the clear terminal of the shift register 72 through the inverter 71, so that the output terminals QA, QB, QC and QD are all cleared to the logic zero. As a result, the output of the inverter 73 becomes the logic one and the clock RCL for demodulation is applied to the clock input terminal of the shift register 72 through the AND gate 74. After the latch signal LFR is changed from the logic one to the logic zero as shown in FIG. 13, the data RDA serving as a base of the data being demodulated determined at the rise of the regenerated clock RCL is the data of the logic one corresponding to the period (13) and the output QA of the shift register 72 becomes the logic one at the rise of the clock RCL. Thereafter the data of the periods (14), (15) and (16) is applied in succession to the shift register 72 in synchronism with the rise of the clock RCL. When the data of the logic one corresponding to the period (13) is transferred to the terminal QD, the respective outputs QA, QB and QC of the shift register 72 are outputted through the AND gates 75, 76 and 77 and at the respective terminals 78, 79 and 80 as the control signals FR-1, FR-2 and FR-3. Since the period (16) is the logic one in case of the FIG. 13 embodiment, the output QA becomes the logic one and the control signal FR-1 is demodulated from the terminal 78. Thereafter, when the following clock RCL is applied to the shift register 72, the output terminal QE becomes the logic one and all the AND gates 74, 75, 76 and 77 are rendered in a disabled state, whereby their initial condition is restored. Although in the foregoing description the logic one was allotted to any one of the periods (14), (15) and (16) corresponding to the control identifying information for the three kinds of the control signals, in the case of allotting the control identifying information as a binary code, then $2^3 = 8$ kinds of control signals can be identified using three periods (14), (15) and (16). Naturally, in such a case, it is necessary to record the binary code by applying the outputs QA, QB and QC of the shift resistor to a recording circuit, not shown.

Although in the foregoing a demodulating circuit for an MFM modulated self-clocking-information signal was described, a demodulating circuit for an FM modulated self-clocking-information signal will be described in the following. In this case, the signal reversion period assumes either a period To or a period 2To, as described previously, and one pulse $\overline{NC}$ is generated based on the latch signal output L1 when the period To is quantized and two pulses $\overline{NC}$ are generated based on the latch signal output L2 when the period 2To is quantized. It is to be noted that the latch outputs L1 and L2 now in discussion are different from those shown in FIG. 4.

Meanwhile, such latch signal outputs L1 and L2 can be obtained by a circuit structured in a manner similar to that of a demodulating circuit for an MFM modulated self-clocking-information signal shown in FIG. 4. More specifically, in case of the MFM modulated self-clocking-information signal, there are three signal reversion periods (2To, 3To and 4To) and therefore the circuit was structured so that the quantized outputs P2, P3 and P4 and thus the latch outputs L2, L3 and L4 may be obtained. However, in case of an FM self-clocking-information signal, there are two signal reversion periods To and 2To. Therefore, by modifying the FIG. 4 quantizing circuit 20, such that the quantized signal P1 is withdrawn in case of the signal reversion period To and the quantized signal P2 is obtained in case of the signal reversion period 2To, while a latch function corresponding to the latch circuit 40 is also contained. Then, the above described latch signal outputs L1 and L2 can be obtained. Since such modification of the circuit configuration would be obvious to those skilled in the art by referring to the previous description in conjunction with FIG. 4, an illustration of such modification is omitted.

In a circuit for demodulating an FM modulated self-clocking-information signal, the pulse generating circuit 50 shown in FIG. 4 may be modified such that one pulse is obtained when the latch signal output L1 is obtained and two pulses are generated when the latch signal output L2 is obtained. Since such modification is also obvious to those skilled in the art, an illustration of such modification is also omitted.

Figure 15:
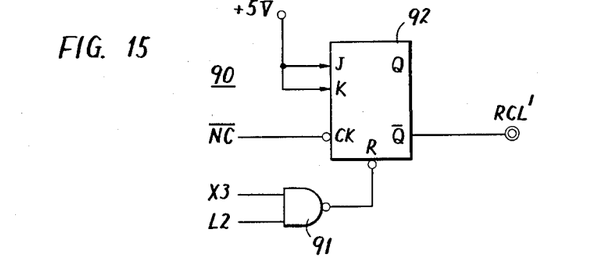
FIG. 15 is a block diagram showing a clock pulse regenerating circuit for an FM modulated self-clocking-information signal.
Figure 16:
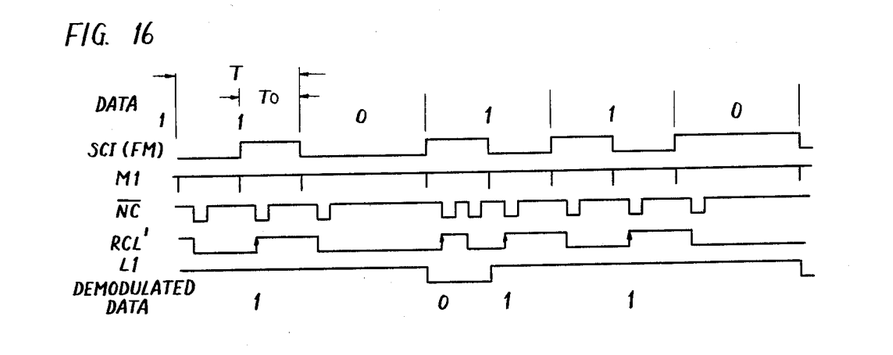
FIG. 16 is a time chart for explaining the operation of a demodulating circuit of an FM modulated self-clocking-information signal.

FIG. 15 is a block diagram of a clock regenerating circuit 90 for an FM modulated self-clocking-information signal, which is to be substituted for the circuit 60 shown in FIG. 4. FIG. 16 is a time chart for explaining demodulation of the FM modulated self-clocking-information signal. In case of an FM modulated self-clocking-information signal, the output of the NAND gate 91 receiving the pulse X3 (corresponding to the output X3 of the shift resistor 4 shown in FIG. 4) and the latch signal output L2 are used to reset the JK flip-flop 92. The pulses $\overline{NC}$ (corresponding to the pulses $\overline{NC}$ of FIG. 4) are frequency divided by 2 by the JK flip-flop 92, so that the output Q is used as a clock pulse RCL' for demodulation of the data. The latch signal output L1 is used as data serving as a base of the data being demodulated and the clock RCL' is used a clock operable at the rise thereof, whereby the original digital data signal is demodulated, as is apparent from FIG. 16.

In the foregoing description, in quantizing the signal reversion periods of an MFM modulated self-clocking-information signal, for example, the period J1 to J2 was quantized to 2To, the period J2 to J3 was quantized to 3To, the period J5 to J4 was quantized to 4To, and the period J5 to J6 was quantized to 8To, respectively. More specifically, a quantization period has been predetermined, so that the same cannot be changed. However, the self-clocking-information signal is susceptible to influences of, e.g., peak shifts, so that the signal reversion periods fluctuate and are not exactly 2To, 3To and so on. For this reason, quantization was made, as described previously. However, the amount of fluctuation depends on the characteristics of a recording medium and a recording circuit of a self-clocking-information signal and varies depending on a time sequential combination of the signal reversion periods of the self-clocking-information signal. In consideration of these respects, it is preferred to implement the embodiment such that the quantized periods may be varied. Therefore, another preferred embodiment of the present invention is structured such that the quantization periods may be changed by providing a quantization period designating circuit 100.

Figure 17:
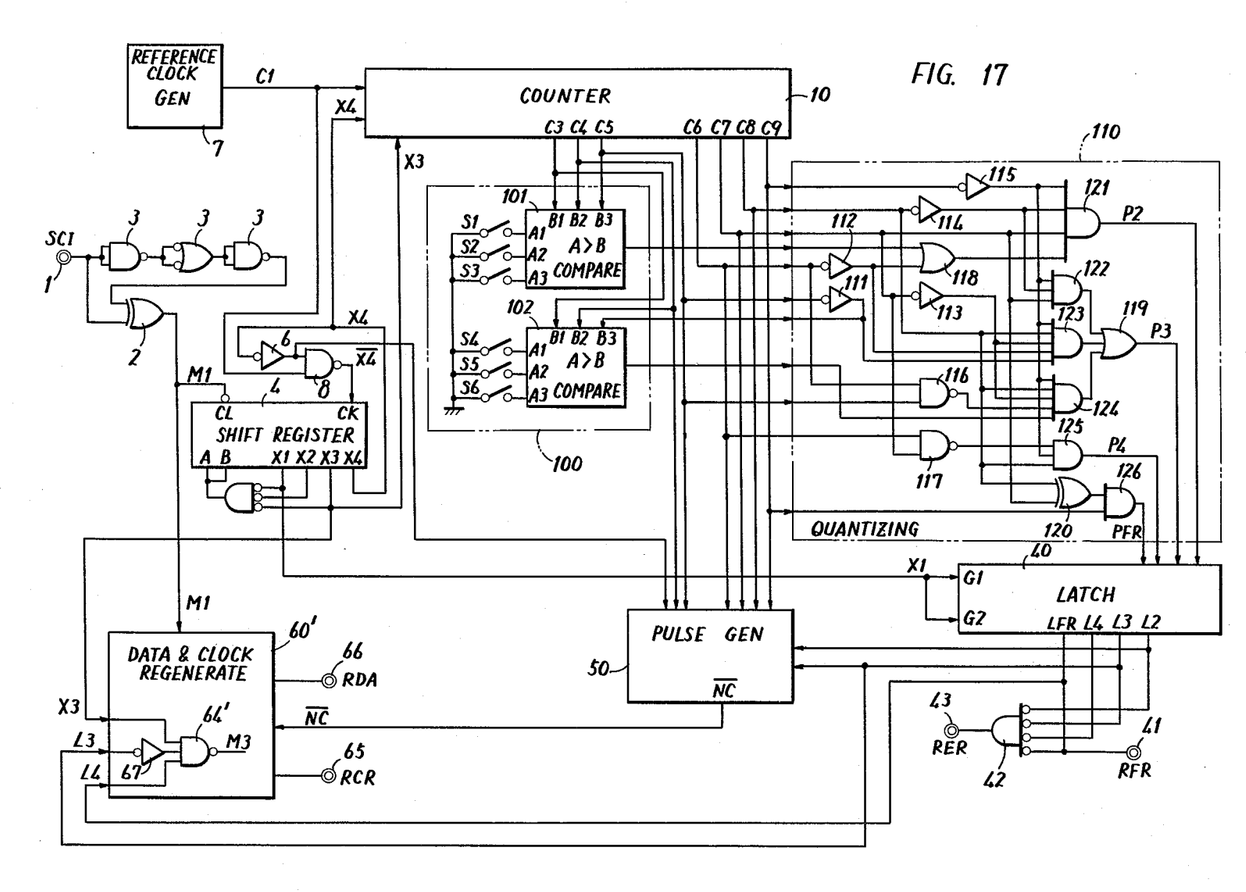
FIG. 17 is a block diagram showing a demodulating circuit of an MFM modulated self-clocking-information signal in accordance with another embodiment of the present invention.
Figure 18:
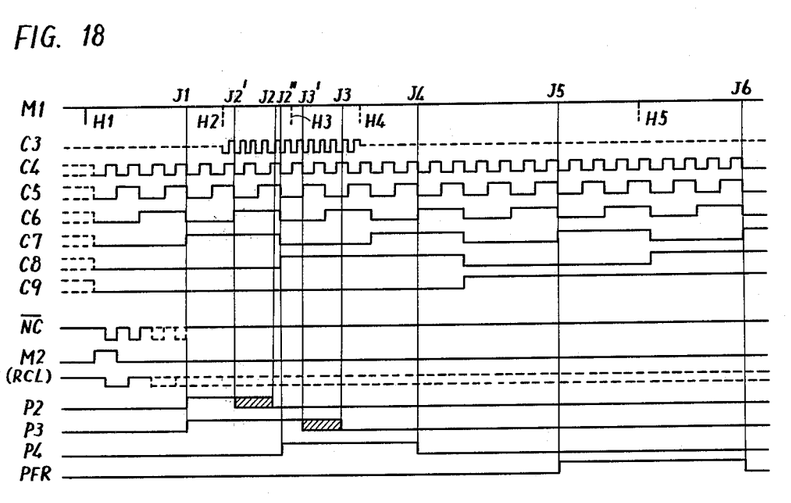
FIG. 18 is a time chart for explaining the operation of the FIG. 17 embodiment.

FIG. 17 is a block diagram showing a demodulating circuit for a self-clocking-information signal having a quantization period designating circuit 100. FIG. 18 is a time chart for explaining the operation of the FIG. 17 embodiment. In comparison with the FIG. 4 demodulating circuit, the FIG. 17 demodulating circuit is substantially the same as the FIG. 4 demodulating circuit, except for additional provision of a quantization period designating circuit 100, a change in the quantizing circuit 110, and a partial change in the circuit 60' for regenerating the data and clock.

The quantization period designating circuit 100 comprises switches S1 to S6 and comparators 101 and 102. The switches S1 to S3 are switches for designating the boundary between the quantization period 2To and the quantization period 3To and the switches S4 to S6 are switches for designating the boundary between the quantization period 3To and the quantization period 4To. These switches S1 to S6 may be structured to be adjustable in a semifixed manner in advance so as to be adaptable to the characteristics of a recording apparatus. The input terminals A1 to A3 at the A side of the comparator 101 are connected to the switches S1 to S3 and the input terminals B1 to B3 at the B side of the comparator 101 are connected to the count outputs C3 to C5 of the measuring circuit 10. Now representing a binary number constituted by a combination of the logical levels based on a manual operation of the switches S1 to S3 being coupled to the terminals A1 to A3 as A=(A3, A2, A1), where A1 is the least significant bit, and by representing a binary number constituted by a combination of the logical levels of the count outputs C3 to C5 being inputted to the terminals B1 to B3 as B=(B3, B2, B1), where B1 is the least significant bit, then in the case where A>B, i.e. A>C[C=(C5, C4, C3)], the output of the comparator 101 becomes the logic one. The boundary between the quantization period 2To and the quantization period 3To is determined by the output of the comparator 101. Although the same applies to the comparator 102, since the terminal B3 is connected to the count output $\overline{C5}$, if and when A>C[C=($\overline{C5}$, C4, C3)], the output of the comparator 102 becomes the logic one. The boundary between the quantization period 3To and the quantization period 4To is determined by the output of the comparator 102.

Now a quantization circuit 110 will be described. The quantization circuit 110 comprises inverters 111 to 115, NAND gates 116 and 117, OR gates 118 and 119, an Exclusive OR gate 120 and AND gates 121 to 126.

(A) The case where the quantized output P2 is obtained

If the output C7 of the measuring circuit 10 is the logic one, the outputs C8 and C9 of the measuring circuit 10 are the logic zero and the output C6 of the measuring circuit 10 is the logic zero or the output of the comparator 101 is the logic one, the output of the AND gate 121 becomes the logic one and the quantized output P2 is obtained. The output of the AND gate 121 is necessarily the logic one in the period J1 to J2' and falls in the period J2' to J2 corresponding to the operated state of the switches S1 to S3 (see FIG. 18). More specifically, the period J2' to J2, including both ends, has been divided into eight, so that the fall position is determined based on the value A determined in correspondence with the operated state of the switches S1 to S3. For example, the output of the AND gate 121 falls at J2' if and when A=the logics zero zero zero and at J2 if and when A=the logics one one one.

(B) The case where the quantized output P3 is obtained (B-1) If the output C7 of the measuring circuit 10 is the logic one and the outputs C8 and C9 of the measuring circuit 10 are the logic zero, the output of the AND gate 122 becomes the logic one.

(B-2) If the outputs C5, C6, C7 and C9 of the measuring circuit 10 are the logic zero and the output C8 of the measuring circuit 10 is the logic one, the output of the AND gate 123 becomes the logic one.

(B-3) If at least one of the outputs C5 and C6 of the measuring circuit 10 is the logic zero and the outputs C7 and C9 of the measuring circuit 10 are the logic zero and the output C8 of the measuring circuit 10 is the logic one and the output of the comparator 102 is the logic one, then the output of the AND gate 124 becomes the logic one.

Accordingly, if any one of the above described states (B-1), (B-2), and (B-3) is assumed, the output of the OR gate 119 becomes the logic one and the quantized output P3 is obtained. The output of the OR gate 119 is necessarily the logic one in the period J1 to J3' and falls in the period J3' to J3 corresponding to the operated state of the switches S4 to S6 (see FIG. 18). More specifically, the period J3' to J3 including both ends, has been divided into eight, so that the fall position is determined by the value of A determined corresponding to the operated state of the switches S4 to S6.

(C) The case where the quantized output P4 is obtained

If the output C8 of the measuring circuit 10 is the logic one, the output C9 of the measuring circuit 10 is the logic zero and at least one of the outputs C6 and C7 of the measuring circuit 10 is the logic zero, then the output of the AND gate 125 becomes the logic one and the quantized output P4 is obtained. More specifically, the quantized output P4 is obtained in the period J2" to J4 (see FIG. 18, P4).

(D) The case where the quantized output PFR is obtained

If the output C9 of the measuring circuit 10 is the logic one and any one of the outputs C7 and C8 of the measuring circuit 10 is the logic one, then the output of the AND gate 126 becomes the logic one and the quantized output PFR is obtained. More specifically, the quantized output PFR is obtained in the period J5 to J6 (see FIG. 18, PFR).

Meanwhile, if the quantized output P2 is the logic one and the latch output L2 is the logic one, two pulses $\overline{NC}$ are obtained from the pulse generating circuit 50, so that quantization is made to 2To, even if the quantized output P3 is the logic one and the latch output L3 is the logic one at that time, as described previously. Accordingly, the boundary between the quantization period 2To and the quantization period 3To is a point where the quantized output P2 falls within the range of the period J2' to J2, which may be designated by the operated state of the switches S1 to S3.

The pulse generating circuit 50 generates three pulses $\overline{NC}$ irrespective of the state of the latch output L4, if and when the latch output L3 of the quantized output P3 is the logic one and the latch output L2 is the logic zero, whereby quantization is made as 3To, as described previously. Accordingly, the boundary between the quantization period 3To and the quantization period 4To is a point where the quantized output P3 falls within the range of the period J3' to J3, which may be designated by the operated state of the switches S4 to S6.

The pulse generating circuit 50 further generates four pulses $\overline{NC}$, if and when the quantized outputs P2 and P3 are the logic zero and the latch output L4 of the quantized output P4 is the logic one. Although the pulse generating circuit generates four pulses $\overline{NC}$ if and when the latch output LFR of the quantized output PFR is the logic one, the same is not used for demodulation of the digital data and the quantized output PFR is used as the frame synchronization signal, as described previously.

A period where the quantized outputs P2 and P3 both become the logic one was prepared, partly because a structure of the pulse generating circuit 50 can be simplified, as described previously. Another and more important reason is that when the embodiment is structured so that the quantization period may be changed and when the quantized output P2 falls in the period J2' to J2 and the quantized output P3 has not become the logic one at that timing, the following disadvantages result. More specifically, if and when the signal reverts and the pulse M1 occurs in the period after the quantized output P2 falls until the quantized output P3 rises, then a situation could occur wherein none of the quantized outputs P2 and P3 is obtained and quantization to 2To or 3To does not occur. Accordingly, it is necessary that the quantized output P3 rises in the period J1 to J2' where the quantized output P2 is the logic one irrespective of the oparated state of the switches S1 to S3. For exactly the same reason, a period where both the quantized outputs P3 and P4 become the logic one was prepared.

Meanwhile, in the case where the period wherein both the quantized outputs P3 and P4 become the logic one is provided, in initializing the polarity of the clock pulse RCL for demodulation of the data, it is necessary to generate the pulse M3 if and when the quantized ouput P3 is the logic zero and the quantized output P4 is the logic one (when the bit pattern of the digital data signal becomes the logics one zero one), to thereby initiate the polarity of the clock pluse RCL. Accordingly, it is necessary to modify the circuit 60 shown in FIG. 4 to the circuit 60' shown in FIG. 17. More specifically, the NAND gate 64' is connected to receive the pulse X3, the latch output L4, and the inverted output L3 of the latch output $\overline{L3}$ as inverted by the inverter 67, to thereby establish an initial condition with the pulse M1 obtained from the NAND gate 64'.

Although quantization of the signal reversion periods of an MFM modulated self-clocking-information signal has been described, in quantizing the signal reversion periods of an FM modulated self-clock-information signal, the embodiment may be structured such that the boundary between the quantization period To and the quantization period 2To may be designated by the switches. Since such a modification would be obvious to those skilled in the art by referring to the foregoing description in conjunction with FIG. 17, an illustration and the description thereof will be omitted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A circuit for demodulating a self-clocking-information signal comprising a rectangle wave pulse train obtained by modulating a digital data signal of the logics one and zero such that the signal reversion periods become two or more predetermined different lengths, comprising:
    period determining means for determining which one of said two or more different length periods by measuring each said signal reversion period of said rectangle wave pulse train,
    pulse generating means responsive to the output of said period determining means for generating pulses which correspond to and uniquely identify said two or more predetermined different length periods, and
    clock pulse regenerating means responsive to the pulses from said pulse generating means for regenerating clock pulses for demodulating said digital data.

2. A demodulating circuit in accordance with claim 1, which further comprises
    data regenerating means responsive to said pulses from said pulse generating means for regenerating data which serves as a base for data being demodulated,
    said data being demodulated being obtained by reading regenerated data from said data regenerating means in accordance with said clock pulse obtained from said clock pulse regenerating means.

3. A demodulating circuit in accordance with claim 2, wherein
    said data regenerating means regenerates said data in accordance with signal reversion in said rectangle wave pulse train and said pulses from said pulse generating means.

4. A demodulating circuit in accordance with claim 2, wherein
    said data regenerating means regenerates said data in accordance with signal reversion in said rectangle wave pulse train, said pulses from said pulse generating means, and said clock pulses obtained from said clock pulse regenerating means.

5. A demodulating circuit in accordance with claim 1, wherein
    said period determining means comprises
        time period measuring means for measuring a time period of each said signal reversion period, and
        quantizing means for quantizing the output of said time period measuring means,
    the output of said quantizing means determining said two or more predetermined different length periods.

6. A demodulating circuit in accordance with claim 5, wherein
    the period ratio of said two or more predetermined different length periods in said rectangle wave pulse train is selected to be one to two, and which further comprises
    data regenerating means responsive to the output of said quantizing means for regenerating data serving as a base of data being demodulated.

7. A demodulating circuit in accordance with claim 6, wherein said data regenerating means is adapted to use that output corresponding to said signal reversion period which itself corresponds to said one out of said outputs of said quantizing means as data serving as a base for data being demodulated.

8. A demodulating circuit in accordance with claim 5, which further comprises
error detecting means responsive to the output of said quantizing means for generating an error detected signal indicating that signal reversion of said predetermined different length periods does not take place.

9. A demodulating circuit in accordance with claim 8, wherein
said error detecting means comprises inverted logical sum means connected to receive said output of said quantizing means.

10. A demodulating circuit in accordance with claims 8 or 9, which further comprises
latch means for latching said output of said quantizing means until the following signal reversion occurs in said rectangle wave pulse train, and wherein
said error detecting means is connected to receive the output of said latch means.

11. A demodulating circuit in accordance with claim 1, wherein
said clock pulse regenerating means comprises frequency dividing means for frequency dividing the pulses from said pulse generating means.

12. A demodulating circuit in accordance with claim 11, which further comprises
reset means for resetting said frequency dividing means if and when signal reversion representing a predetermined logical pattern occurs.

13. A demodulating circuit in accordance with claim 12, wherein
said reset means is adapted to reset said frequency dividing means if and when said period determining means determines the longest one of said two or more predetermined different length periods.

14. A demodulating circuit in accordance with claim 5, wherein said clock pulse regenerating means comprises
frequency dividing means for frequency dividing the pulses from said pulse generating means.

15. A demodulating circuit in accordance with claim 14, which further comprises
reset means for resetting said frequency dividing means responsive to the output of said quantizing means which corresponds to the longest one out of said two or more predetermined different lengths periods.

16. A demodulating circuit in accordance with claim 15, which further comprises
latch means for latching the output of said quantizing means until the following signal reversion occurs in said rectangle wave pulse train, and wherein
said reset means is adapted to reset said frequency dividing means responsive to one of the outputs of said latch means in correspondence with the output of said quantizing means.

17. A demodulating circuit in accordance with claim 5, which further comprises
reference clock pulse generating means for generating reference clock pulses, and wherein
said time period measuring means comprises counter means for counting said reference clock pulses during each said signal reversion period in said rectangle wave pulse train.

18. A demodulating circuit in accordance with claim 17, wherein said quantizing means comprises a plurality of gate means connected to receive the outputs of said counter means.

19. A demodulating circuit in accordance with claim 18, wherein said pulse generating means comprises a plurality of gate means connected to receive the outputs of said counter means and the outputs of said quantizing means.

20. A demodulating circuit in accordance with claim 19, which further comprises
latch means for latching said outputs of said quantizing means until the following signal reversion occurs in said rectangle wave pulse train, and wherein
said pulse generating means comprises a plurality of gate means connected to receive the outputs of said counter means and the outputs of said latch means.

21. A demodulating circuit in accordance with claims 1, 2, 3, 4, 5, 6, 7, 8, 9, 11, 12, 13, 14, 15, 16, 17, 18, 19, or 20 wherein
said rectangle wave pulse train comprises a control signal of a further predetermined period which is longer than said two or more predetermined different length periods, and
said pulse generating means is adapted to generate pulses of a further predetermined number corresponding to said further predetermined period when said period determining means determines said further predetermined period.

22. A demodulating circuit in accordance with claim 21, wherein
said further predetermined number of pulses from said pulse generating means is selected to be the number corresponding to the maximum number of the pulses generated to correspond to and uniquely identify said two or more predetermined different length periods.

23. A demodulating circuit in accordance with claim 21, wherein
said control signal is one of a plurality of kinds,
said rectangle wave pulse train comprises a kind signal identifying the kind of said control signal at the position following said further predetermined period allotted for said control signal, and which further comprises
kind signal generating means for generating a signal representing the kind of said control signal determined by said kind signal.

24. A demodulating circuit in accordance with claim 5, which further comprises
quantization period designating means responsive to the output of said time period measuring means for designating a period being quantized by said quantizing means.

25. A demodulating circuit in accordance with claim 24, wherein
said quantization period designating means comprises
designating signal providing means for providing a signal for designating said quantization period, and
comparing means for comparing the output of said time period measuring means and said designating signal from said designating signal providing means.

26. A demodulating circuit in accordance with claim 25, which further comprises
reference clock pulse generating means for generating reference clock pulses, and wherein
said time period measuring means comprises counter means for counting said reference clock pulses during each said signal reversion period.

* * * * *